United States Patent
Sugimoto

(10) Patent No.: US 8,346,744 B2
(45) Date of Patent: Jan. 1, 2013

(54) DATABASE MANAGEMENT METHOD, DATABASE MANAGEMENT SYSTEM, AND PROCESSING PROGRAM THEREFOR

(75) Inventor: Yuki Sugimoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 333 days.

(21) Appl. No.: 12/703,661

(22) Filed: Feb. 10, 2010

(65) Prior Publication Data

US 2011/0040725 A1 Feb. 17, 2011

(30) Foreign Application Priority Data

Aug. 12, 2009 (JP) ................................ 2009-186956

(51) Int. Cl.
*G06F 7/00* (2006.01)
*G06F 17/30* (2006.01)
(52) U.S. Cl. ........................................ 707/705; 718/100
(58) Field of Classification Search .................. 707/705; 718/100
See application file for complete search history.

(56) References Cited

U.S. PATENT DOCUMENTS

| | | | | |
|---|---|---|---|---|
| 5,394,531 A * | 2/1995 | Smith | ........................... | 711/136 |
| 6,081,906 A * | 6/2000 | Nishizawa et al. | ................ | 714/2 |
| 6,535,878 B1 * | 3/2003 | Guedalia et al. | ................... | 707/8 |
| 6,859,926 B1 * | 2/2005 | Brenner et al. | ................ | 718/100 |
| 6,947,987 B2 * | 9/2005 | Boland | .......................... | 709/226 |
| 6,970,805 B1 * | 11/2005 | Bierma et al. | ................. | 702/182 |
| 7,100,161 B2 * | 8/2006 | Latour | ........................... | 718/102 |
| 7,302,450 B2 * | 11/2007 | Benedetti et al. | .......... | 707/104.1 |
| 2007/0022100 A1 | 1/2007 | Kitsuregawa et al. | | |
| 2007/0220028 A1 | 9/2007 | Hikawa et al. | | |
| 2008/0178183 A1 * | 7/2008 | Accapadi et al. | ............. | 718/102 |
| 2009/0024551 A1 * | 1/2009 | Agrawal et al. | ................. | 706/47 |

FOREIGN PATENT DOCUMENTS

| | | |
|---|---|---|
| JP | 10-049309 | 2/1998 |
| JP | 2004-362376 | 12/2004 |
| JP | 2007-34414 A | 2/2007 |
| JP | 2007-249468 A | 9/2007 |

* cited by examiner

*Primary Examiner* — Marc Somers
(74) *Attorney, Agent, or Firm* — Foley & Lardner LLP

(57) ABSTRACT

A method of increasing a processing performance by setting a suitable upper limit of a resources count for each processing request according to an arrangement of hardware such as a storage device or to contents of the processing request. A processing request acceptor accepts the processing request as a data query. An auxiliary storage device forms a storage area where a database is stored. A data operation executor analyzes the accepted processing request and executed the data operations on the basis of the analyzed result. A resource manager manages the respective data operations allocated to generated processes or threads. A buffer manager caches data of the data operations upon execution of the data operations from the auxiliary storage device to a memory, and determines whether or not the data as the target of the data operations are present in the cache.

3 Claims, 16 Drawing Sheets

| TABLE ID (401) | TABLE NAME (402) | STORAGE AREA ID (403) |
|---|---|---|
| 101 | T1 | 201 |
| 102 | T2 | 202 |
| 103 | T3 | 203 |
| 104 | T4 | 204 |
| : | : | : |

| INDEX ID (404) | INDEX NAME (405) | TARGET TABLE ID (401) | STORAGE AREA ID (403) |
|---|---|---|---|
| 301 | I11 | 101 | 205 |
| 302 | I21 | 102 | 206 |
| 303 | I22 | 102 | 207 |
| 304 | I41 | 104 | 208 |
| : | : | : | : |

FIG. 9

| LOGICAL DEVICE ID | I/O PERFORMANCE |
|---|---|
| 201 | 1000 |
| 202 | 1000 |
| 203 | 3000 |
| 204 | 3000 |
| : | : |

FIG. 12

| DISK DEVICE ID | REFERENCE RESOURCES COUNT |
|---|---|
| HD-0001 | 10 |
| HD-0002 | 20 |
| HD-0003 | 15 |
| HD-0004 | 30 |
| : | : |

FIG. 13

| STORAGE AREA ID | MAXIMUM IOPS | RESOURCES COUNT UPON ACQUISITION OF MAXIMUM IOPS |
|---|---|---|
| 201 | 100 | 5 |
| 202 | 200 | 10 |
| 203 | 50 | 2 |
| 204 | 2000 | 20 |
| ⋮ | ⋮ | ⋮ |

DATABASE MANAGEMENT METHOD, DATABASE MANAGEMENT SYSTEM, AND PROCESSING PROGRAM THEREFOR

INCORPORATION BY REFERENCE

The present application claims priority from Japanese application JP2009-186956 filed on Aug. 12, 2009, the content of which is hereby incorporated by reference into this application.

BACKGROUND OF THE INVENTION

The present invention relates to a database management technique which can be applied widely to a database management system (DBMS).

Such a technique as disclosed in JP-A-2007-249468 has been so far employed for a database management system to dynamically allocate CPU resources and execute a database processing request.

As the need for large-scale analysis is increasing in these years, such a technique as disclosed in JP-A-2007-34414 is employed, wherein high-speed processing is required by parallel processing which utilizes many resources including processes and threads within a database management system.

Further, even with respect to data operations such as index creation, data insertion and data update in the database management system, such a technique as to increase the processing speed by parallelly processing a single processing request from a user or an application program has also become popular.

SUMMARY OF THE INVENTION

Such processing requires use of many resources including processes and threads. However, there exists such a state that allocation of even an increased number of resources results in the fact that a performance cannot be increased depending upon, for example, the input/output performance of a storage device. In the case of, for example, processes or threads, even allocation of an increased number of resources in such a state involves an increased cost necessary for switching such processes or threads and so on, and in some cases, even increase of the resources count beyond a predetermined value reversely deteriorates the performance.

Such a system as an operating system has generally an upper value for the number of resources usable for the entire system. There occurs, in some cases, such a situation that, when a plurality of processing requests are executed and one of the executed processing requests executed firstly uses resources up to its upper limit, a necessary number of resources cannot be allocated to the next processing request, thus resulting in a low performance.

In the database management system, on the other hand, when each access is made to each of threads prepared for accesses to already stored data for example, the access can be made with a less number of threads. In other words, in order to processing a request with use of an optimum number of processes or threads, it becomes important to determine an upper limit value for the number of processes or threads.

An object of the present invention is to increase a processing performance by setting a suitable upper limit for the number of resources for each of processing requests depending upon the arrangement of hardware such as a storage device or the contents of each processing request.

In accordance with an aspect of the present invention, the above object is attained by providing a database management system which includes a processing request acceptor which accepts a processing request as a data query; an auxiliary storage device in which storage areas for storing data stored in a database are arranged; a data operation executor which analyzes the accepted processing request and operates a plurality of pieces of data on the basis of the analyzed result; a resource manager which manages each of the data operations allocated to generated processes or threads; and a buffer manager which caches data as a target of the data operation from the auxiliary storage device into a memory upon execution of the data operations and determines whether or not the data as the target of the data operations is present in a cache. When the data operation executor executes the data operations, the buffer manager determines whether or not the data is present in the cache. The resource manager determines the usable state of the processes or threads in the data operations when the data is not present in the cache. When some of the processes or threads are free or usable, the resource manager sends an access request of caching data as the target of the executed data operations in the memory to the auxiliary storage device in order to execute the data operations through the processes or threads. When all the processes or threads are already used, the resource manager executes the data operations after some of the processes or threads are released or free. In the presence of the data in the cache, the resource manager executes the data operations.

In the present invention, since an upper limit for the number of resources allocated to a single processing request is set in the database management system, the resources can be efficiently used.

Other objects, features and advantages of the invention will become apparent from the following description of the embodiments of the invention taken in conjunction with the accompanying drawings.

BRIEF DESCRIPTION OF THE DRAWINGS

FIG. 4 schematically shows a table for explaining schema definition information;

FIG. 9 schematically shows a table for explaining an example of the storage arrangement information when the I/O performance is treated as the storage arrangement information;

FIG. 12 schematically shows a table for explaining a relationship between a reference resources count and a disk device;

FIG. 13 schematically shows a table for explaining performance statistical information;

DESCRIPTION OF THE EMBODIMENTS

Embodiment 1:

A first embodiment of the present invention will be explained with reference to the accompanying drawings.

Figure 2:
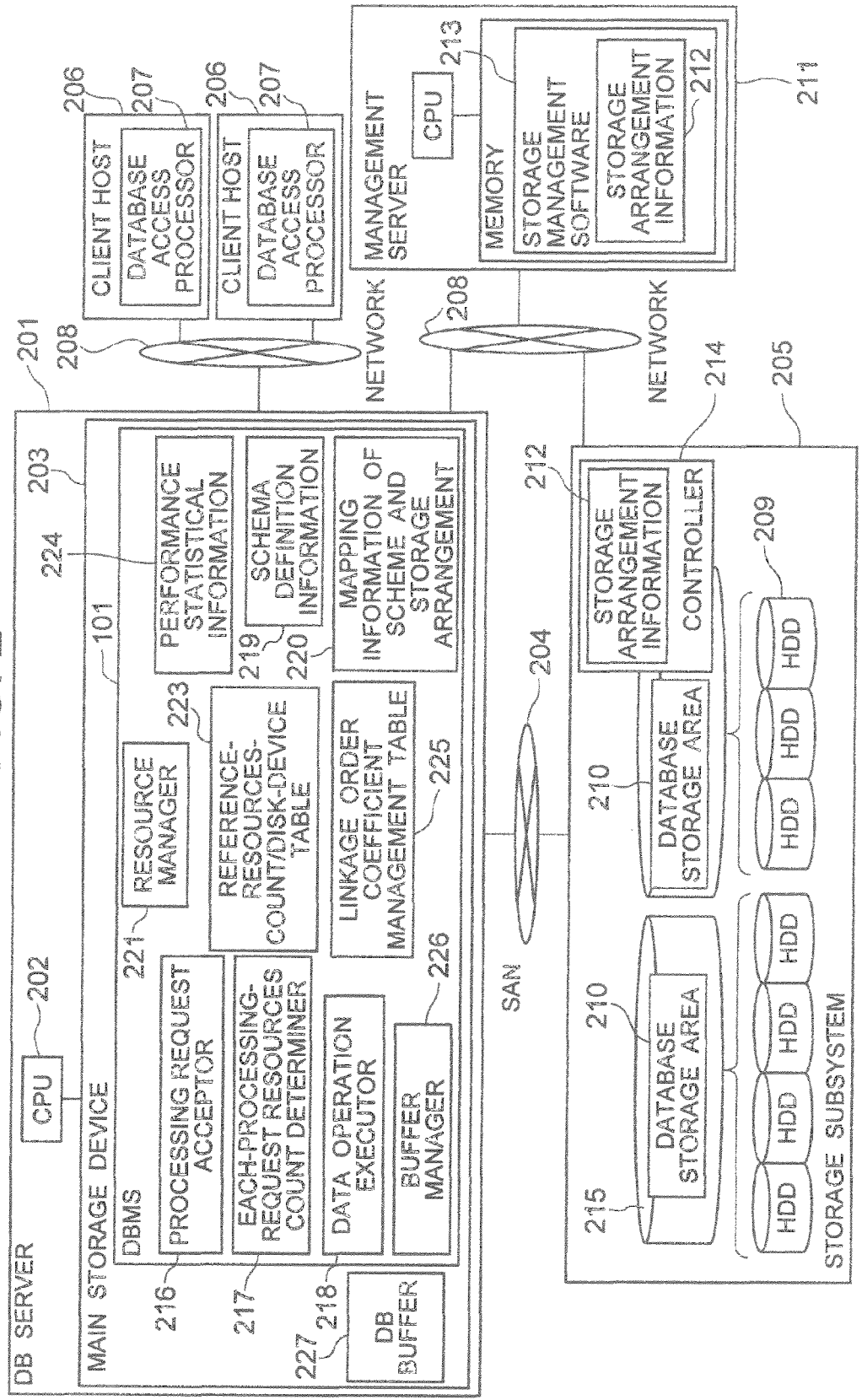
FIG. 2 shows a schematic configuration of a computer system in an embodiment of the present invention.

FIG. 2 shows, as an example, a schematic configuration of a computer system in an embodiment of the present invention.

A computer system 201 includes a CPU (Computer Processing Unit) 202 and a main storage device 203. The computer system is connected to a storage subsystem 205 via a storage area network 204. The computer system is also connected to many client hosts 206 each having a database access processor 207 via a network 208.

Database storage areas 210 for storing data to be managed by a database management system 101 are provided in areas of a plurality of disk devices 209 within the storage subsystem 205. The storage subsystem 205 also has a controller 214 for managing storage arrangement information 212 including a correlation between data storage areas 215 and the disk devices 209.

The storage subsystem 205 may be formed as a disk device built in the computer system 201.

A management server 211 is a server for managing a storage area network environment and contains storage management software 213 which manages the storage arrangement information 212.

The storage management software 213 may be built in the storage subsystem 205.

The database management system 101 is provided in the main storage device 203.

The database management system 101 has a processing request acceptor 216 as a already known means for accepting a processing request including data search from the client host 206, a data operation executor 218 as an already known means for causing the database management system 101 to execute the data operations provided in the database storage area 210, schema definition information 219 such as information about database table structure, a resource manager 221 for causing the database management system 101 to hold processes or threads and allocating the processing operation, an each-request resources-count determiner 217 for determining the number of resources for each processing request, mapping information 220 of schema and storage arrangement indicating a table definition etc. and the disk device having the data management area which is storing the table definition etc., and a reference resources count 222 as a threads count which can get the best I/O performance per one disk device.

The reference resources count 222 can be derived from experimental values or the like for the same hardware arrangement. In the present embodiment, a reference-resources-count/disk-device table 223 showing a relationship between disk device ID 1201 such as a model number indicating the type of the disk device 209 and the reference-resources count 222 is stored.

The processing operations of the aforementioned respective processors are executed under control of the CPU 202. In this connection, the respective processors may be called also as corresponding processing means. The respective processors can be implemented by hardware (for example, a circuit), a computer program, an object or by combining these (for example, by executing part of the processing under control of the computer program and by executing part of the processing under control of the hardware circuit). Each computer program can be read from a storage resource (such as a memory) provided in a computer machine. The computer program may be installed in the storage resource via a recording medium such as CD-ROM or DVD (Digital Versatile Disk), or may be downloaded via a communication network such as the Internet or an LAN.

FIG. 12 schematically shows a table for explaining the reference-resources-count/disk-device table 223. A correlation between the disk device ID 1201 such as a model number indicating the type of the disk device and the reference-resources count 222 is stored in the table.

The reference-resources-count/disk-device table 223 may be used so that the database management system 101 acquires performance statistical information 224 upon data operation execution and determines the reference-resources count 222 corresponding to the associated disk device 209 from the performance statistical information about the disk device 209.

Since such performance statistical information can be acquired generally by the database management system 101 or by the operating system, the system, for example, can measure the number of inputs/outputs per one second (IOPS), detect an IOPS when operated with one resource and the state that the IOPS cannot be increased any longer even if the resources count is increased, and employ the resources count when the IOPS reaches its upper limit as the reference-resources count FIG. 13 schematically shows a table for explaining the performance statistical information 224.

In the present embodiment, the performance statistical information 224 includes a storage area ID 403, a maximum IOPS 1301 so far generated, and a number 1302 of resources having accessed to the area upon acquisition of the maximum IOPS.

Although the resources count is treated as a threads count in the present embodiment, similar processing can be carried out even for the number of the other resources such as a processes count.

The database management system 101 generally has a buffer management function 226 of caching disk data in the memory and managing whether or not the data is present in a DB buffer 227 for the purpose of increasing a data operation performance.

Figure 1:
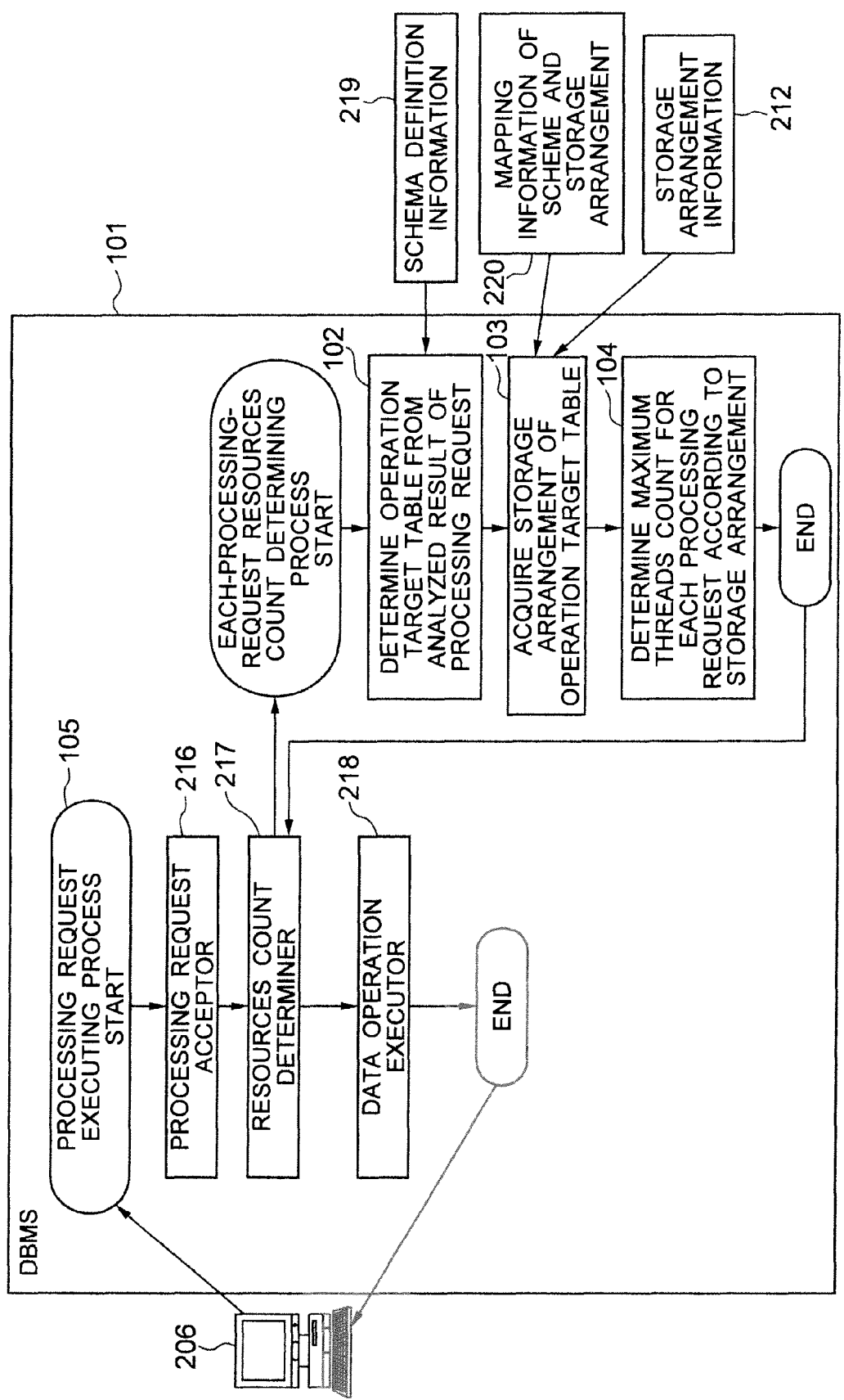
FIG. 1 shows a conceptual view for explaining an each-request resources-count determiner for determining the number of resources for each processing request in the present invention.

FIG. 1 shows a schematic diagram for explaining the each-request resources-count determiner for determining a resources count for each processing request in the present invention. The database management system 101 has a processing request executor 105 for accepting and executing a processing request from the client host 206.

Though such a processing request is usually issued from a business application or the like, such a request may also be issued by a user from the client host computer 206 as a terminal or the like to the database management system 101 to process the processing request.

In the processing request executor 105, the processing request is accepted by the processing request acceptor 216 for accepting the processing request, and the processing request is parsed, optimized and converted to an execution logic as a group of data operation instructions including data updating in a table or data reading therefrom. The data operation executor 218 reads such execution logic and executes the data operation.

The each-request resources-count determiner determines a search target table from the analyzed result on the basis of the schema definition information 219 (step 102).

On the basis of the storage arrangement information 212 and the mapping information 220 of a scheme and storage arrangement, the each-request resources-count determiner acquires a storage arrangement in the operation target table indicating which disk devices 209 data in tables located in (step 103).

On the basis of the acquired storage arrangement, the each-request resources-count determiner determines a maximum threads count suitable for each processing request corresponding to the storage arrangement (step 104).

Figure 3:
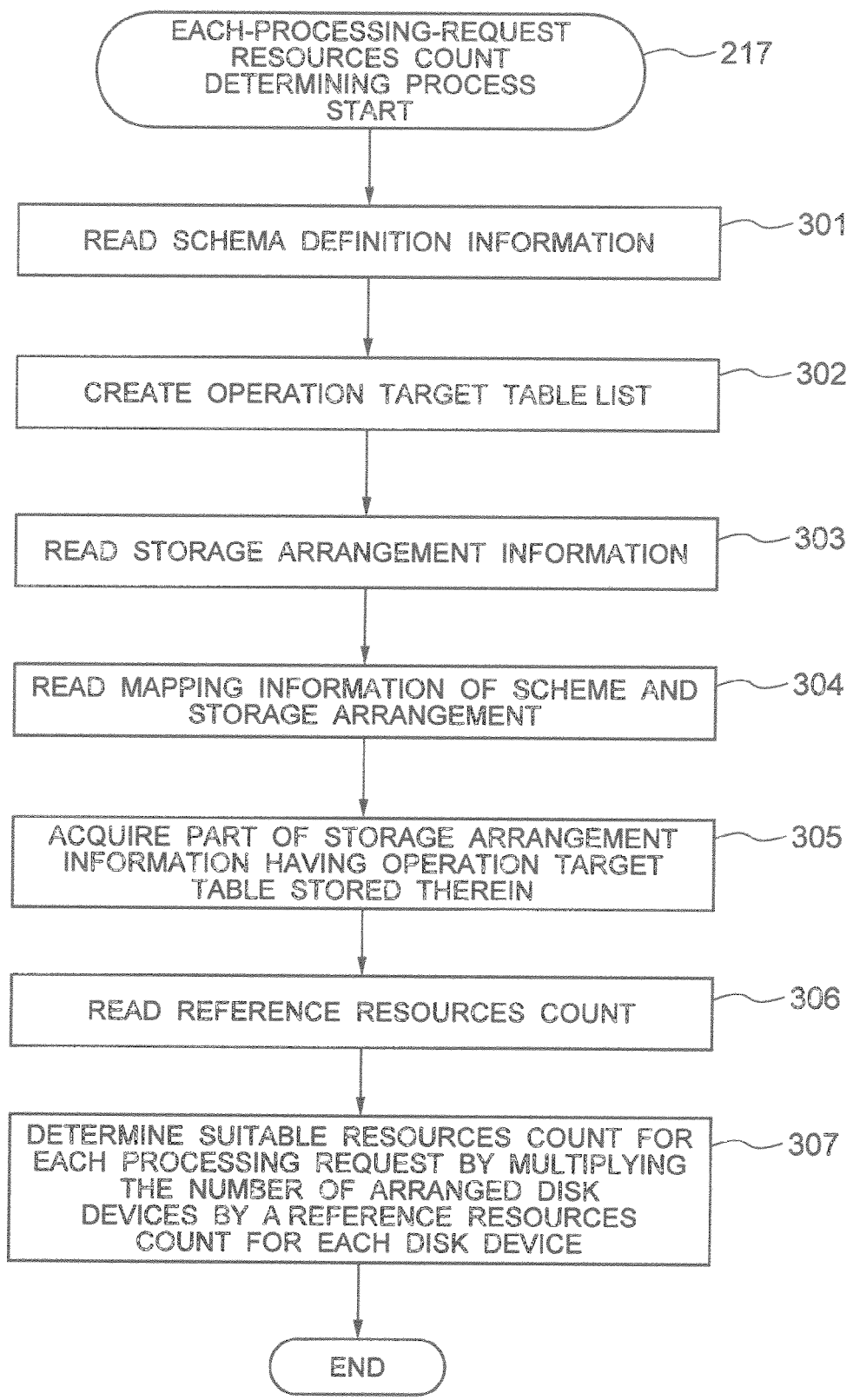
FIG. 3 is a flow chart for explaining details of the each-request resources-count determiner.

FIG. 3 is a flow chart for explaining details of the each-request resources-count determiner 217, and corresponds to details of the each-request resources-count determiner in FIG. 1.

The each-request resources-count determiner 217 reads the schema definition information 219 (step 301), and prepares a list of operation target tables included in the processing request analysis result (step 302).

The each-request resources-count determiner then reads storage arrangement information from the storage management software 213 or from the controller 214 of the storage subsystem 205 (step 303).

The storage arrangement information 212 indicates the number of physical disk devices in which the area being used is formed, and can be acquired from the controller 214 of the storage subsystem 205 or from the storage management software 213 for management of the storage subsystem 205.

Further, the each-request resources-count determiner reads the mapping information 220 of a scheme and storage arrangement possessed by the database management system 101 (step 304), and combines the mapping information 220 of a scheme and storage arrangement and the storage arrangement information obtained in the step 303 to obtain the storage arrangement information 212 about the operation target table being stored (step 305).

The each-request resources-count determiner now reads a reference resources count as a threads count per one disk device (step 306), multiplies the storage arrangement information 212 obtained in the step 305, that is, the number of the arranged disk devices 209 by the reference resources count 222, and determines a suitable threads count for each processing request (step 307).

In this connection, a disk device rotational speed, an input/output throughput performance or a response performance in place of the disk devices count may also be used as the storage arrangement information 212 to obtain similar processing operation.

FIG. 4 schematically shows a table for explaining the schema definition information 219.

The schema definition information 219 includes a table name 402 for an operation target, a table ID 401 for identifying a table in the processing interior, and a storage area ID 403 as an ID of a storage area in which the table is actually stored.

In this connection, the table name or the storage area name may be also used as an ID.

Even an index prepared for the purpose of high-speed search similarly has information about an index name 405, an index ID 404, an ID 403 of an area where the index name and the index ID 404 are stored, and an ID 401 of the table in which the index is defined.

In the present embodiment, the schema definition information is stored in the memory. However, the schema definition information may be stored in another location, for example, in the disk device, so long as the information can be read out upon execution of the each-request resources-count determiner.

Figure 11:
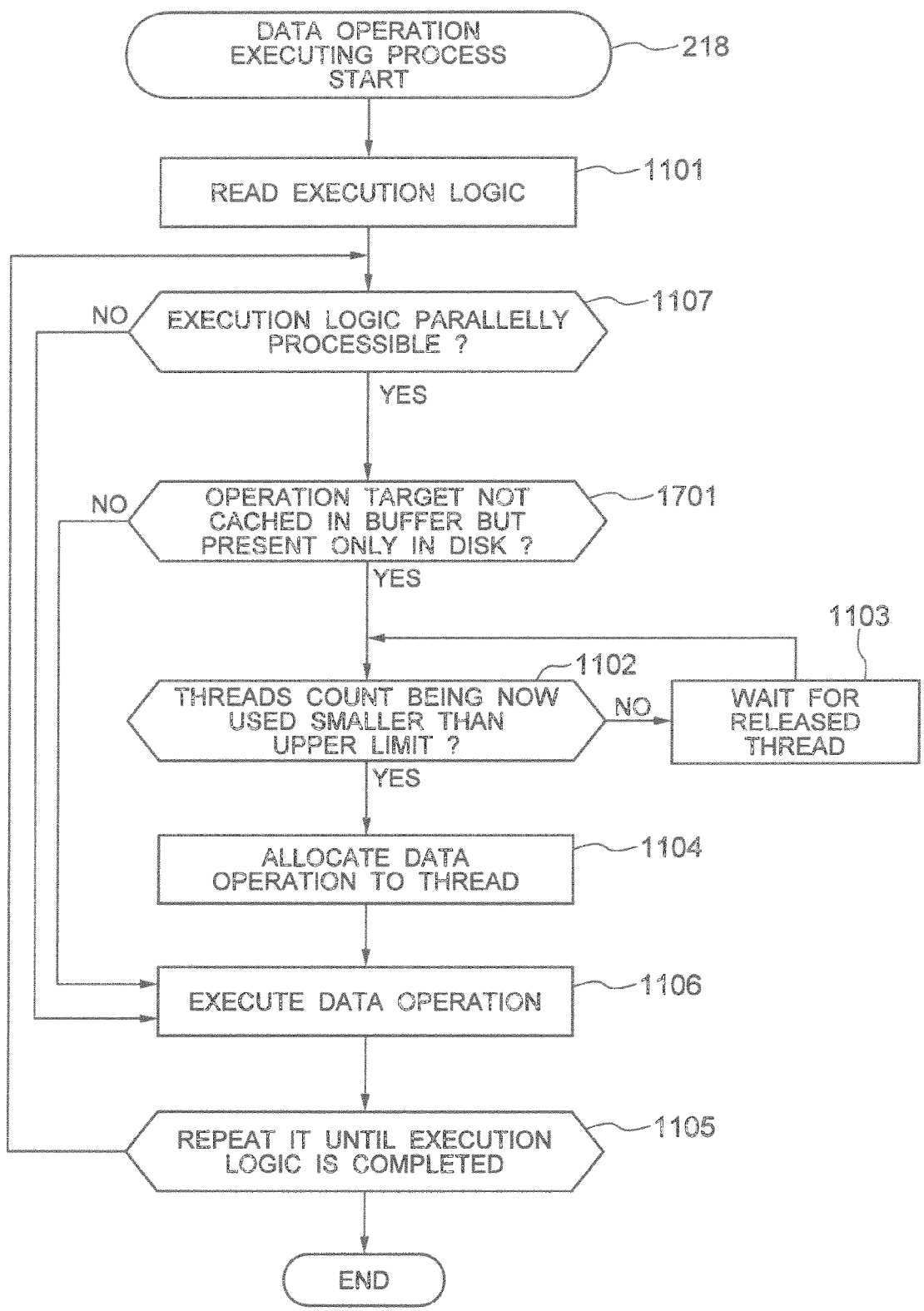
FIG. 11 is a flow chart for explaining the operation of the data operation executor for executing operations involved by input/output (I/O) to/from a disk.

FIG. 11 is a flow chart for explaining the data operation executor 218 for executing the operation involved by input/output to/from the disk device.

The data operation executor 218 first reads the execution logic (step 1101), and determines whether or not the execution logic can be parallelly processed as previously defined (step 1107).

When the execution logic can be parallelly processed, the operation target is not cached in the buffer, and the data operation executor confirms whether or not the operation target is present only in the disk (step 1701).

When the operation target is not cached in the buffer, the data operation executor confirms whether or not the threads count now being used fails to reach its upper limit (step 1102). When the threads count now being used reaches its upper limit, the data operation executor waits for a released thread (step 1103). When the threads count being used fails to reach its upper limit, the data operation executor allocates the data operation to a thread (step 1104) and executes the data operation (step 1106).

When the execution logic can be parallelly processed and when the operation target is cached in the buffer, the data operation executor simply executes the data operation (step 1105).

And the above steps are repeated until the execution logic is completed (step 1105).

When the data operation executor reads the cached data using the DB buffer 227, even allocation of many threads fails to obtain a great effect.

To avoid this, it is considered to determine whether or not the data operation target is cached upon execution of the processing request, to read the data as it is when the data is cached in the DB buffer 227, and to allocate the data to thread and execute it when the data is not cached.

When the data operation executor 218 executes the aforementioned processing operations, resource allocation considering the cached state of the data can be attained.

Figure 5:
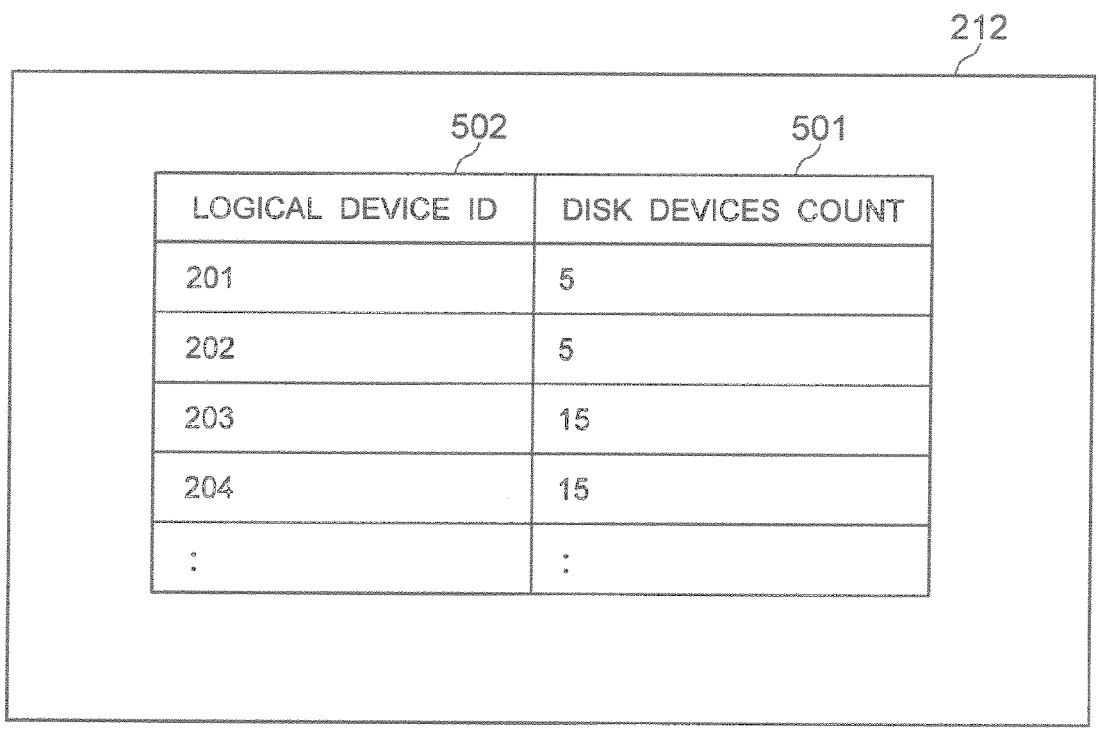
FIG. 5 schematically shows a table for explaining storage arrangement information.

FIG. 5 schematically shows a table for explaining the storage arrangement information 212.

The storage arrangement information 212 includes a logical device ID 502 that the database server can recognize the logical device and a disk devices count 501 indicating the number of disk devices used for the area.

With respect to the disk devices count, the disk devices count can have a relationship of a plurality of correlations overlapped when the hierarchy becomes complex by virtualizing the storage devices or the like, and when the area has a plurality of spanned areas, the disk devices count can be approximated to an average of the plurality of areas.

Figure 6:
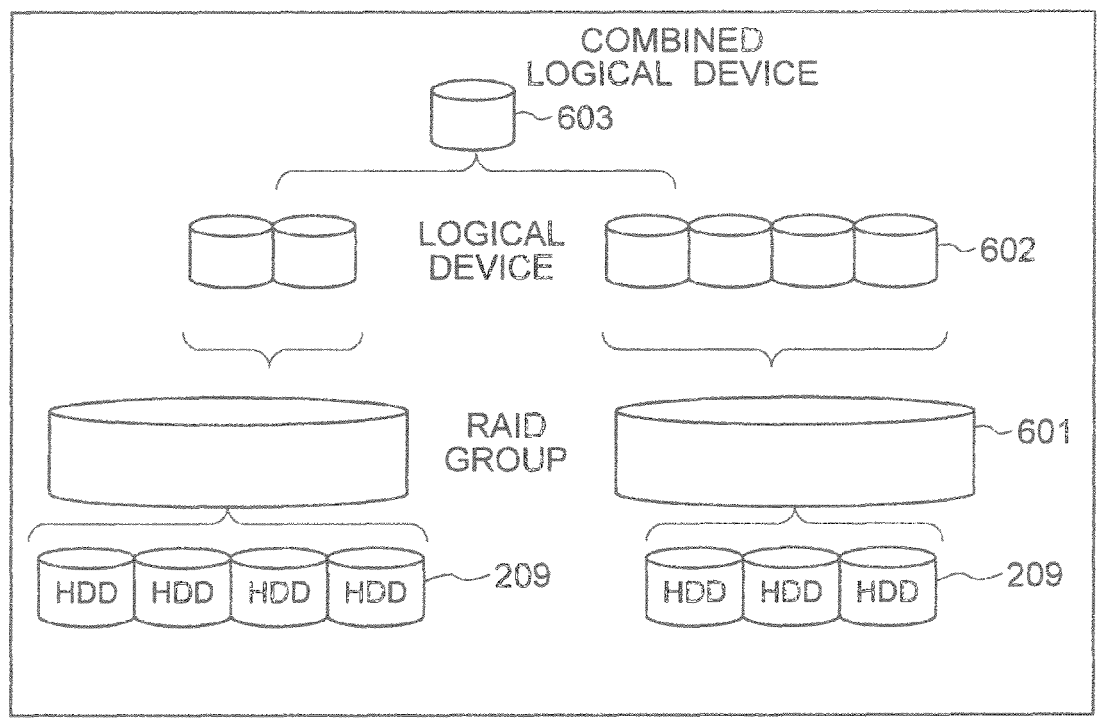
FIG. 6 schematically shows a diagram for explaining the storage arrangement information when the hierarchy of a storage device is made complex.

FIG. 6 schematically shows a diagram for explaining the storage arrangement information 212 when the hierarchy of storage devices becomes complex.

In this example, a plurality of disk devices 209 are combined into a RAID group 601, and each of such RAID groups 601 is divided into logical devices 602, some of the divided logical devices 602 are extracted from the plurality of RAID groups 601 and combined into a single logical device 603.

In such a case, an average disk devices count as all the RAID groups is assumed to be the disk devices count 501 corresponding to the database storage area 210.

The respective disk devices counts may be weighted on the basis of a ratio among disk capacities being used, and the disk devices count 501 corresponding to the database storage area 210 may be determined.

Figure 7:
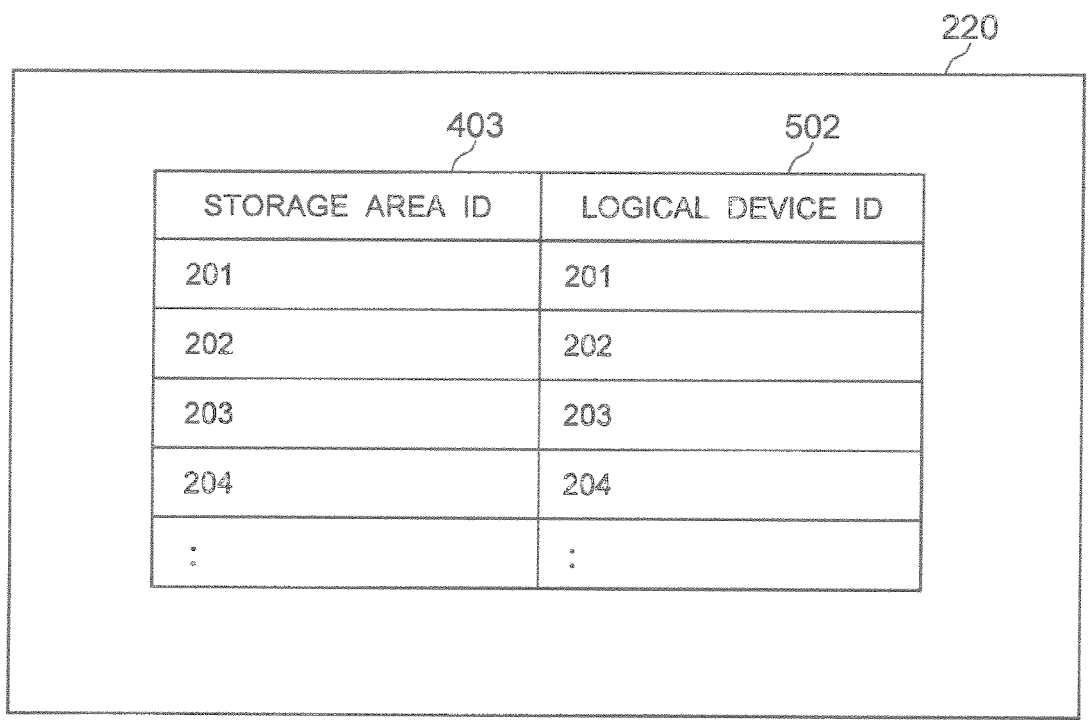
FIG. 7 schematically shows a table for explaining mapping information about schema and storage.

FIG. 7 schematically shows a table for explaining the mapping information 220 of a scheme and storage arrangement.

The mapping information 220 of a scheme and storage arrangement includes a storage area ID 403 indicating an area where data is stored and a logical device ID 502 corresponding to the storage area.

In this case, one storage area may have a plurality of logical devices or a plurality of storage areas may have a single logical device.

As examples other than the above example, various arrangements using the functions of the storage subsystem and operating system are considered. Even in such cases, the disk devices count 501 corresponding to the database storage area 210 can be determined in the same manner as in the aforementioned case.

In this case, the storage arrangement information 212 may be treated as the storage arrangement information 212 simply with the I/O performance of the storage area as in the case of the disk devices count.

Figure 8:
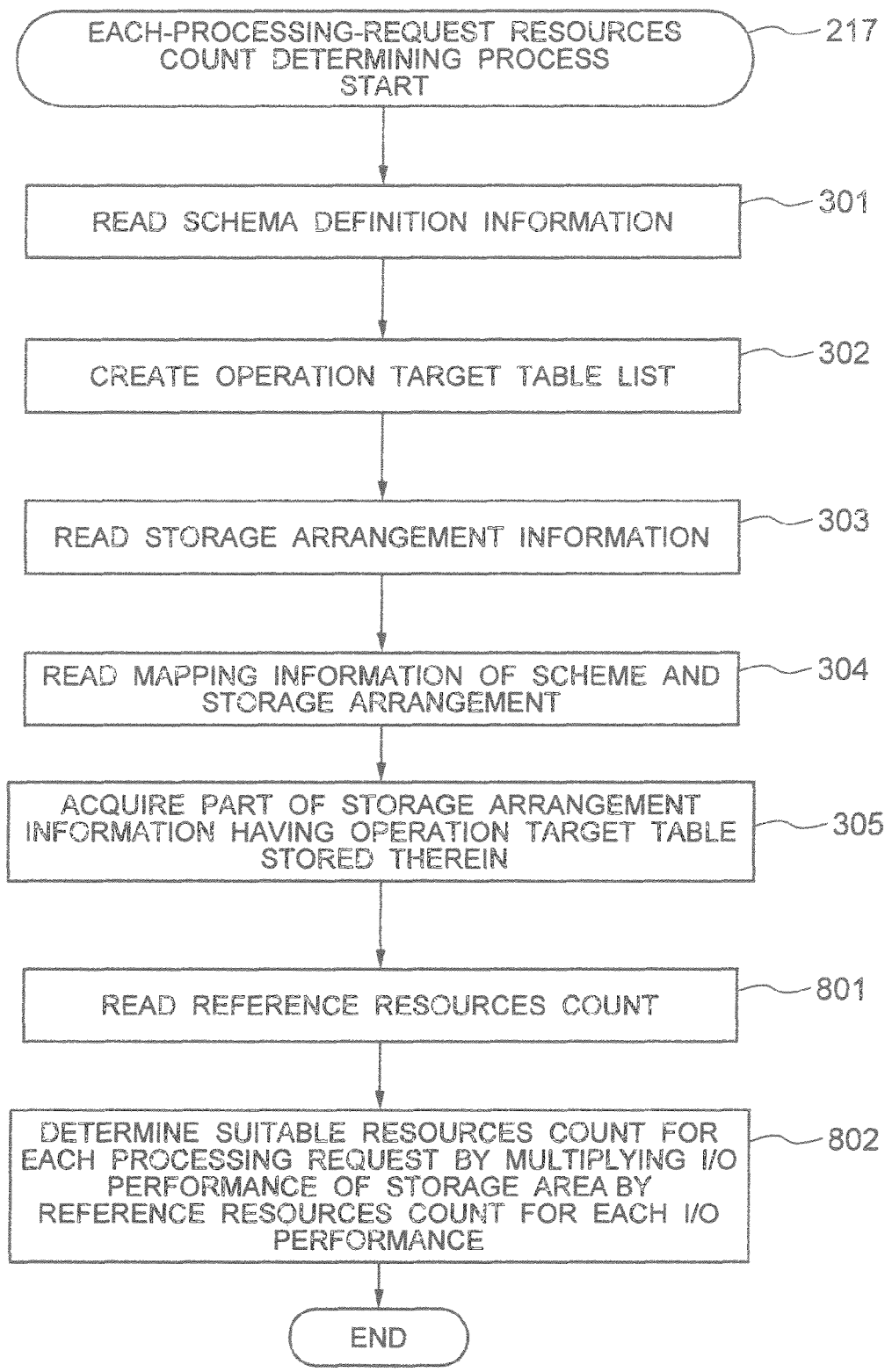
FIG. 8 shows a flow chart for explaining details of the each-request resources-count determiner when an I/O (Input/Output) performance is used as the storage arrangement information.

FIG. 8 is a flow chart for explaining details of the each-request resources-count determiner 217 for each processing request similarly to FIG. 3, and shows an example when the I/O performance is used as the storage arrangement information.

In this flow chart, the operations of steps 301 to 305 are similar to the contents already explained in FIG. 3.

The each-request resources-count determiner reads a threads count per unit I/O performance as the reference resources count in place of reading the reference resources count as a threads count per one storage in the step 306 of FIG. 3 (step 801).

The each-request resources-count determiner, in place of the step 307 of FIG. 3, derives an optimum threads count for each processing request by multiplying the threads count per unit I/O performance by the I/O performance of the storage area (step 802).

Figure 9:
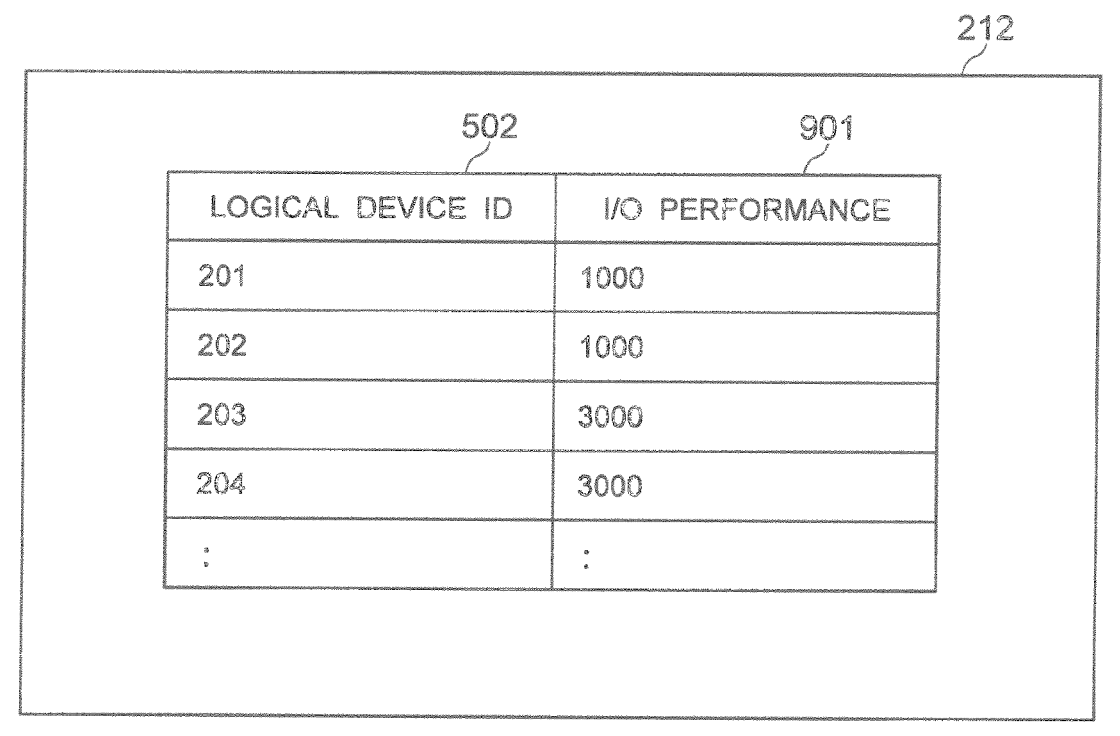

FIG. 9 schematically shows a table for explaining an example of the storage arrangement information when the I/O performance is treated as the storage arrangement information 212.

In this case, the storage arrangement information 212 includes the logical device ID 502 which can be recognized by the database server, and also an I/O performance 901 indicating how many inputs/outputs the area can produce.

When the data arrangement is biased, the system cannot possibly exhibit a theoretical performance. In the present invention, however, when searching objects are evenly distributed, the system can exhibit especially a high effect. When a scale of stored data is sufficiently large, the data are expected to be evenly distributed.

Embodiment 2:

A second embodiment corresponds to an example when the system waits for a linkage process of processing data of a plurality of tables in association with each other, and the schematic configuration of its computer system is similar to that of FIG. 2.

When the system waits for such a linkage process, in order to operate the plurality of tables simultaneously, it is required to allocate a suitable resources count to each of the operation target tables.

Figure 10:
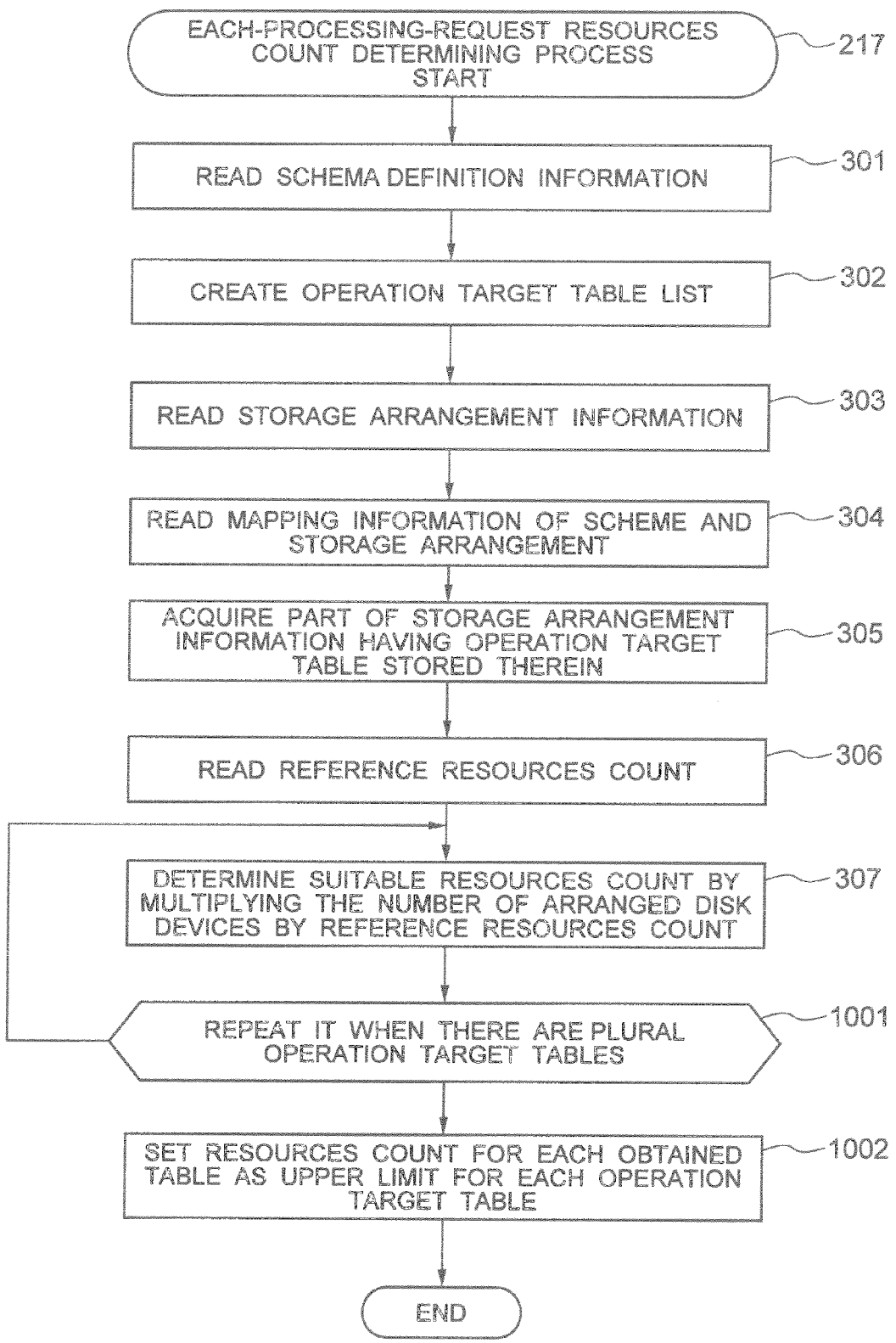
FIG. 10 is a flow chart for explaining the operation when resources are allocated to each operation target table in linking operation.

FIG. 10 is a flow chart for explaining the operations of a linkage process of allocating a resources count to each of operation target tables.

In the flow chart, the operations of steps 301 to 307 are similar to the contents already explained in FIG. 3.

In this flow chart, the operation of determining a suitable resources count for each processing request by multiplying the disk device arrangement count of the step 307 by the reference resources count is repeated by a number of times corresponding to the number of the operation target tables (step 1001).

The obtained resources count for each table is stored as a resources count upper limit for each operation target table (step 1002).

At this time, the data operation executor, which is similar to that in FIG. 11, checks whether or not a threads count currently being used reaches its upper limit in a step 1102 for each table. When the current threads count exceeds its upper limit allocated to one table, the data operation executor executes a step (step 1103) to wait for thread release.

Figure 14:
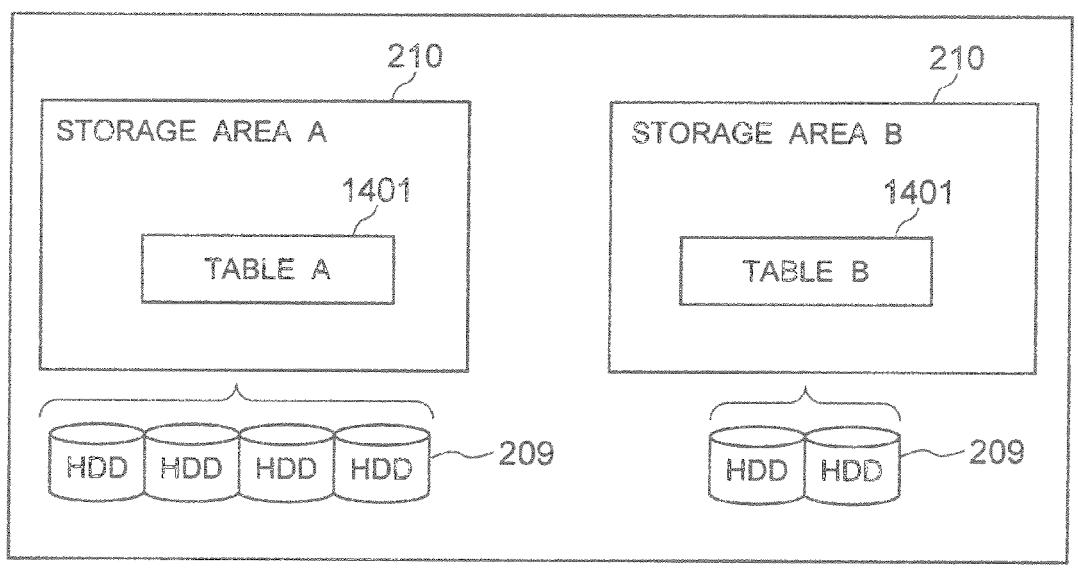
FIG. 14 is a diagram for explaining the effects of the resources count allocation in the linking operation.

FIG. 14 is a schematic diagram for explaining the effect of resources count allocation in the linkage process. In this case, the storage area 210 having 4 disk devices 209 and the storage area 210 having two disk devices 209 are provided. A table 1401 having data stored therein is provided in each of the storage areas.

When the system executes the linkage process to match data in two tables under such a condition, merely a sum of resources count upper limits of all the tables can be treated as an entire resources count upper limit. As explained in the above embodiment, however, when resources count upper limits are set for respective tables A and B in search thereof, search of the table A is executed using resources corresponding to 4 disk devices, and search of the table B is executed using two disk devices. In accordance with the present embodiment in this way, even when an access to a plurality of storage areas is made for a single database processing request, a suitable resources count allocation can be attained for each area.

In general, when a system has a linkage process, data to be linked later in linkage order tend to be read more than data to be linked earlier in linkage order. Thus a method of setting a resources count requirement of allocating a larger number of resources to the data to be linked later in linkage order than the data to be linked earlier may be employed.

Figure 15:
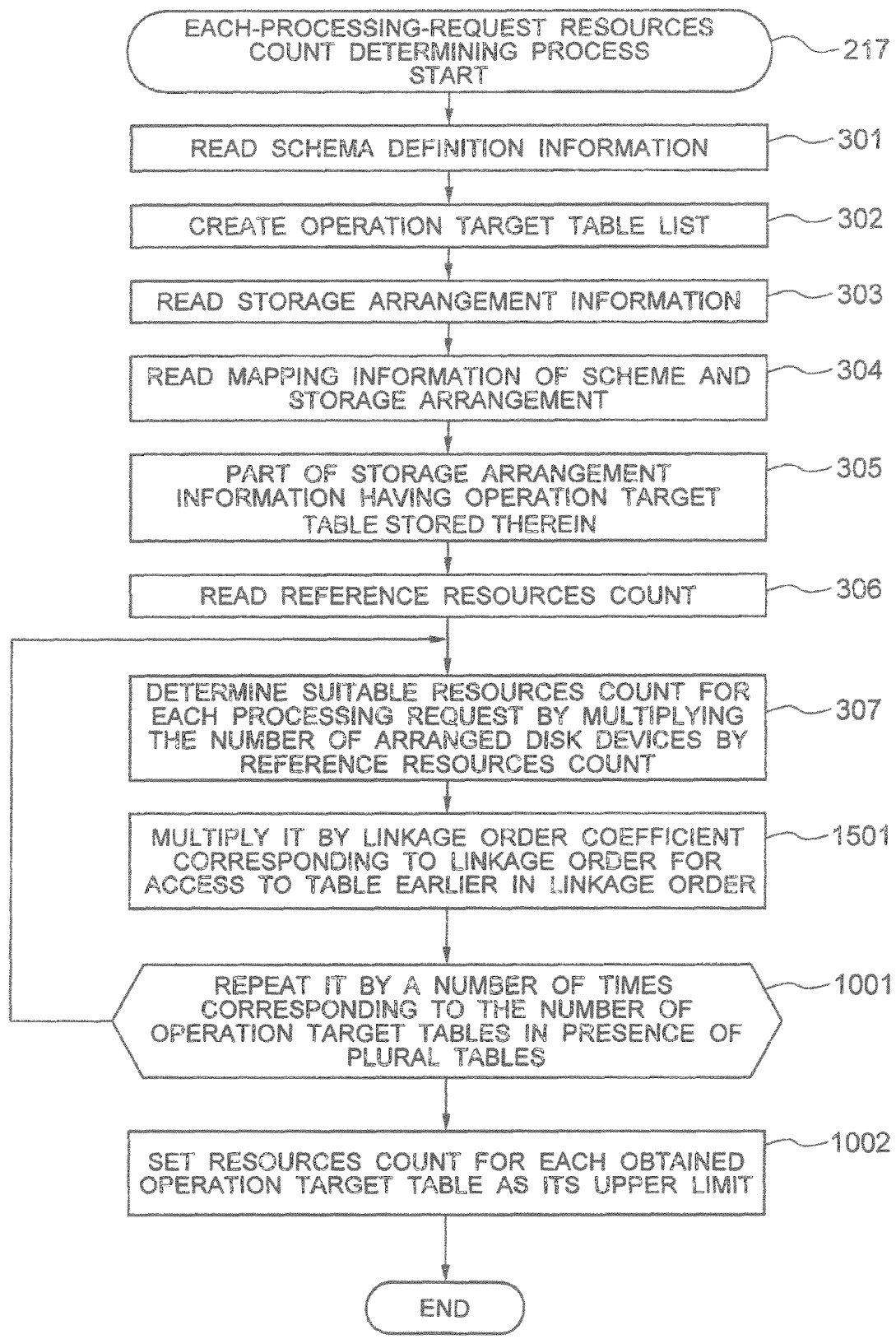
FIG. 15 is a flowchart for explaining the resources count allocation when a linking sequence in the linking operation is considered.

FIG. 15 is a flow chart for explaining the resources count allocation when consideration is paid to a linkage order in a linkage process.

In the flow chart, the operations of steps 301 to 307, 1001, and 1002 are similar to the contents already explained in FIG. 10.

In a step 1501 after the step 307 of determining a suitable resources count for each processing request by multiplying the number of arranged disk devices by the reference resources count, the resources count is modified by multiplying it by a linkage order coefficient 1602 associated with a linkage order 1601.

The linkage order coefficient, which is previously kept in the system as a constant value, has a value smaller than 1. Whether or not data is processed earlier or later in linkage order is determined and easily discriminated by the processing request acceptor.

Figure 16:
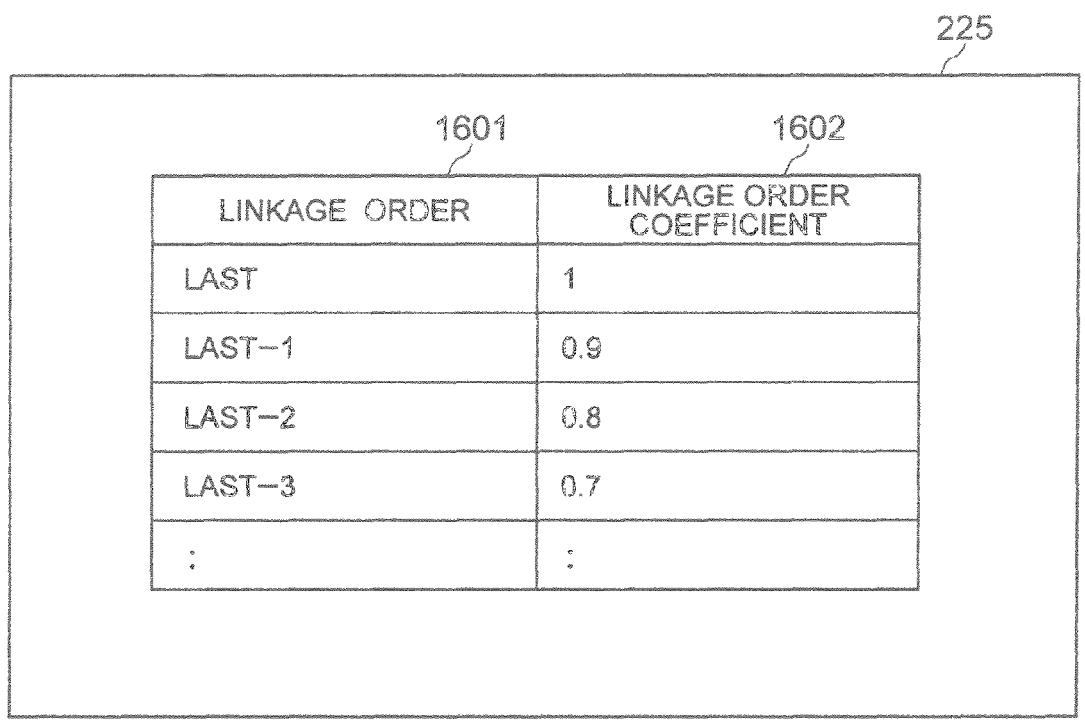
FIG. 16 schematically shows a linking order coefficient management table.

FIG. 16 is a schematic diagram for explaining a linkage order coefficient management table 225.

The linkage order coefficient management table 225 shows a relationship between the linkage order 1601 and the linkage order coefficient 1602. The linkage order coefficient 1602 is set at 1 in the last linkage and at a value smaller than 1 in the order earlier therethan. The earlier the linkage order is the smaller the linkage order coefficient is.

Since the linkage order coefficient depends on the number of pieces of data to be accessed in the table, the coefficient cannot determined before execution of the access request. As an example, the linkage order coefficient is considered merely based on the linkage order to be previously set at 0.9 for linkage one previous to the last linkage, 0.8 for linkage two previous to the last linkage, and 0.1 for linkages smaller than 0.1.

As has been explained above, when data are stored in a plurality of storage devices and many resources are used, the system can efficiently use such resources, which leads to its high-speed operation as a whole.

The embodiments of the present invention have been explained above. However, these embodiments are exemplified merely for the purpose of explaining the present invention, and the scope of the invention is not limited only to the illustrated embodiments. The present invention can be embodied in various ways without departing from the gist of the invention.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A database management method in a database management system comprising an auxiliary storage device having a storage area for storing a database therein, the method comprising the steps of:

a processing request acceptor accepts a processing request as a data query;

a data operation executor analyzes the accepted processing request and executing a plurality of data operations on the basis of the analyzed result;

a resource manager manages the data operations allocated to generated processes or threads; and an each-processing-request each-request resources-count determiner obtains schema definition information including information about a table structure of the database, storage arrangement information including mapping of a storage area for storing data in the database and of an area of the auxiliary storage device, mapping information of a scheme and storage arrangement, and a reference resources count, indicating a processes count or a threads count producing a predetermined performance when a processes count or a threads count is varied to the auxiliary storage device, and the each-processing-request resources count determiner calculates on the basis of the number of the auxiliary storage devices and the reference resources count and determines an upper limit of the processes or threads count used by the accepted processing request for each execution of the processing request, wherein, when data as a target of the data operations is stored in a plurality of the storage areas, the each-processing-request resources count determiner determines an upper limit in the processes or threads count on the basis of the number of the auxiliary storage devices having the data as the data operation target stored therein for each storage area, wherein the each-processing-request resources count determiner determines a sum of upper limits in the processes or threads count found for the respective storage areas as an upper limit for the entire processing request, and wherein, when an execution request of a linkage process of linking a plurality of associated data is accepted, the each-processing-request resources count determiner sets the upper limit value in the processes or threads count at a value in such a manner that the upper limit value for data later in a linkage order of the linkage process is set to be larger than the upper limit value for data earlier in the linkage order when linking data are stored in the different storage areas upon execution of the linkage process.

2. A database management method in a database management system comprising an auxiliary storage device having a storage area for storing a database therein, the method comprising the steps of:

a processing request acceptor accepts a processing request as a data query;

a data operation executor analyzes the accepted processing request and executing a plurality of data operations on the basis of the analyzed result;

a resource manager manages the data operations allocated to generated processes or threads; and an each-processing-request each-request resources-count determiner obtains schema definition information including information about a table structure of the database, storage arrangement information including mapping of a storage area for storing data in the database and of an area of the auxiliary storage device, mapping information of a scheme and storage arrangement, and a reference resources count, indicating a processes count or a threads count producing a predetermined performance when a processes count or a threads count is varied to the auxiliary storage device, and the each-processing-request resources count determiner calculates on the basis of the number of the auxiliary storage devices and the reference resources count and determines an upper limit of the processes or threads count used by the accepted processing request for each execution of the processing request, wherein the each-processing-request resources count determiner determines an upper limit value in the processes or threads count on the basis of performance statistical information about the database management system acquired upon execution of past processing requests, wherein, when data as a target of the data operations is stored in a plurality of the storage areas, the each-processing-request resources count determiner determines an upper limit in the processes or threads count on the basis of the number of the auxiliary storage devices having the data as the data operation target stored therein for each storage area, wherein the each-processing-request resources count determiner determines a sum of upper limits in the processes or threads count found for the respective storage areas as an upper limit for the entire processing request, wherein, when an execution request of a linkage process of linking a plurality of associated data is accepted, the each-processing-request resources count determiner sets the upper limit value in the processes or threads count at a value in such a manner that the upper limit value for data later in a linkage order of the linkage process is set to be larger than the upper limit value for data earlier in the linkage order when linking data are stored in the different storage areas upon execution of the linkage process.

3. A database management method in a database management system comprising an auxiliary storage device having a storage area for storing a database therein, the method comprising the steps of:

a processing request acceptor accepts a processing request as a data query;

a data operation executor analyzes the accepted processing request and executing a plurality of data operations on the basis of the analyzed result;

a resource manager manages the data operations allocated to generated processes or threads; and an each-processing-request each-request resources-count determiner obtains schema definition information including information about a table structure of the database, storage arrangement information including mapping of a storage area for storing data in the database and of an area of the auxiliary storage device, mapping information of a scheme and storage arrangement, and a reference resources count, indicating a processes count or a threads count producing a predetermined performance when a processes count or a threads count is varied to the auxiliary storage device, and the each-processing-request resources count determiner calculates on the basis of the number of the auxiliary storage devices and the reference resources count and determines an upper limit of the processes or threads count used by the accepted processing request for each execution of the processing request, wherein the each-processing-request resources count determiner determines an upper limit value in the processes or threads count on the basis of an Input/Output (I/O) performance of the storage area, wherein, when data as a target of the data operations is stored in a plurality of the storage areas, the each-processing-request resources count determiner determines an upper limit in the processes or threads count on the basis of the number of the auxiliary storage devices having the data as the data operation target stored therein for each storage area, wherein the each-processing-request resources count determiner determines a sum of upper limits in the processes or threads count found for the respective storage areas as an upper limit for the entire processing request, and wherein, when an execution request of a linkage process of linking a plurality of associated data is accepted, the each-processing-request resources count determiner sets the upper limit value in the processes or threads count at a value in such a manner that the upper limit value for data later in a linkage order of the linkage process is set to he larger than the upper limit value for data earlier in the linkage order when linking data are stored in the different storage areas upon execution of the linkage process.

* * * * *